(12) United States Patent
Gashkov et al.

(10) Patent No.: US 6,934,733 B1
(45) Date of Patent: Aug. 23, 2005

(54) OPTIMIZATION OF ADDER BASED CIRCUIT ARCHITECTURE

(75) Inventors: Sergej B. Gashkov, Moscow (RU); Alexander E. Andreev, San Jose, CA (US); Aiguo Lu, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 620 days.

(21) Appl. No.: 10/017,802

(22) Filed: Dec. 12, 2001

(51) Int. Cl.[7] .................................................. G06F 7/50
(52) U.S. Cl. ..................................................... 708/706
(58) Field of Search ................................. 708/706–714

(56) References Cited

U.S. PATENT DOCUMENTS 4,159,529 A * 6/1979 Stakhov ...................... 708/670
4,276,608 A * 6/1981 Stakhov et al. ............. 708/670

* cited by examiner

*Primary Examiner*—D. H. Malzahn
(74) *Attorney, Agent, or Firm*—Westman, Champlin & Kelly, P.A.

(57) ABSTRACT

An adder based circuit embodied in an integrated circuit includes an input module, a carry module and an output module. The carry module has a minimum depth defined by a recursive expansion of at least one function associated with the carry module based on a variable k derived from a Fibonacci series. Invertor, XOR, XNOR (more preferably, OR(NOT(a),b)) and multiplexer elements are selectively coupled to the input and output modules to configure the adder based circuit as a subtractor, adder-subtractor, incrementor, decrementor, incrementer-decrementor or absolute value calculator. A computer process of designing the adder base circuit recursively expands the functions, and optimization of death, fanout and distribution of negations is performed.

20 Claims, 8 Drawing Sheets

AO21

OPTIMIZATION OF ADDER BASED CIRCUIT ARCHITECTURE

CROSS REFERENCE TO RELATED APPLICATION

This application is related to application Ser. No. 10/017,792 filed Dec. 12, 2001 for "Optimization of Comparator Architecture" by Sergej B. Gashkov, Alexander E. Andreev and Aiguo Lu and assigned to the same assignee as the present invention, which application is incorporated herein by reference.

FIELD OF THE INVENTION

This invention relates to digital adders, and particularly to adders for use in application specific integrated circuits (ASICs).

BACKGROUND OF THE INVENTION

Adders are widely used in ASICs and represent one of the most common and basic circuit functions of general purpose digital computers and processors. Adder based circuits include adders, subtractors, adder-subtractors, incrementors, decrementors, incrementor-decrementors, and absolute value calculators, to name a few. Nearly every datapath module of nearly every digital IC includes adder based circuits. Thus, adders are crucial to the operation of computers, processors and controllers.

Each element on a chip, be it an element of an adder or some other device, is derived from a library of cells, the library being technology dependent based on the processing technology used to fabricate the IC chip. Each cell requires some space (area) on the chip, and the cells forming the element require some depth to the chip. Consequently, the elements formed by the cells require some minimum amount of volume on the chip.

Most adders are implemented to perform a Boolean function such that $S\_n=A\_n+B\_n$, where $S\_n$ is the digital output and $A\_n$ and $B\_n$ are the digital inputs. Most adders are composed of AND, OR and Exclusive-NOR (XNOR) elements. However, these elements often require considerable space and depth, and signal propagation through the element may cause timing delays.

As integrated circuit processing continues to advance, the need increases for smaller, faster adders. The present invention is directed to this need.

The aforementioned application of Gashkov et al. describes a comparator architecture for ICs based on a Fibonacci series. The resulting circuit is smaller and has less depth, and hence less delay, than a corresponding comparator of traditional design. The present invention extends that concept to adders for ICs.

SUMMARY OF THE INVENTION

In accordance with the present invention, an adder is implemented as three modules, an input module, a carry module, and an output module. The input and/or output modules are optimized based on a global analysis of the Boolean representations of functions to optimize circuit area and depth and reduce delay. The carry module is based on a Fibonacci series.

In one embodiment, an adder based circuit is embodied in an integrated circuit. The adder based circuit comprises an input module that receives inputs $A[i]$ and $B[i]$ to generate $U[i]=A[i]\&B[i]$ and either $V[i]=A[i]\vee B[i]$ or $V[i]=A[i]\oplus B[i]$. A carry module is responsive to $U[i]$ and $V[i]$ to generate carry functions. An output module is responsive to the $U[i]$, $V[i]$ and carry functions to provide an output function $$S = \sum_{i=0}^{n} 2^i S[i] = \sum_{i=0}^{n-1} 2^i A[i] + \sum_{i=0}^{n-1} 2^i B[i].$$

The carry module has a minimal depth defined by a recursive expansion of at least one carry function associated with the carry module based at least in part on a variable k, where $k=F\_l$ and $n-k=F\_\{l-1\}$ and where l satisfies $F\_l<n\leq F\_\{l+1\}$, $\{F\_l\}$ is a Fibonacci series and n is the number of bits of at least one of $U[i]$ and $V[i]$.

In various embodiments, the adder based circuit functions as a subtractor, adder-subtractor, incrementor, decrementor, increment-decrementor and absolute value calculator, depending on elements applied to the inputs and outputs.

In some embodiments, an adder is designed for an integrated circuit. At least one output function of a carry module of the adder is defined in terms of a Fibonacci series. The output functions are recursively expanded to find a minimum parameter of the Fibonacci series.

In one embodiment, recursive functions are defined as $h'\_l=h\_1(U[k+1],U[k+2],V[k+2],\ldots,U[k+1],V[k+1])$ and $v'\_l=V[k+1]\&,\ldots,\&V[k+1]$, based on the carry functions, where $k=F\_l$ and $n-k=F\_\{l-1\}$, l satisfies $F\_l<n\leq F\_\{l+1\}$, $\{F\_l\}$ is the Fibonacci series defined recursively from the equality $F\_\{l+1\}=F\{l\}+F\_\{l+1\}$ and n is the number of bits of an input to the carry module. The recursive functions are recursively expanded to minimize l.

In some embodiments, negations are optimally distributed in the carry module by identifying a set of delay vectors, recursively comparing the delay vectors to derive a set of minimum vectors, and selecting a vector with a minimum norm from the set of minimum vectors.

In other embodiments the depth of the adder is minimized by recursively expanding expressions $DH\_n=\min\{\max(DH\_\{n-k\}+1,Dh\_k+2,DH\_k)\}$ and $Dh\_n=\min\{\max(Dh\_\{n-k\}+1,Dh\_k+2)\}$, where $DH\_k$ and $Dh\_k$ are based on vectors of depths $U[i]$ for $0\leq i\leq k-1$ and $DH\_\{n-k\}$ and $Dh\_\{n-k\}$ are based on vectors for $k\leq i\leq n-1$. A value of k is selected based on a minimum of at least one of $DH\_n$ and $Dh\_n$.

In other embodiments, the fanout depth of the adder based circuit is minimized by defining recursive functions $H\hat{} i\_k=h\hat{}\{i+l\}\_\{k-l\}\vee v\hat{}\{i+l\}\_\{k-l\}\&h\hat{} i\_l$ and $v\hat{} i\_l=v\hat{}\{i+l\}\_\{k'l\}\&v\hat{} i\_l$ based on the output function, where $k=F\_l$ and $n-k=F\_\{l-1\}$, l satisfies $F\_l<n\leq F\_\{l+1\}$, $\{F\_l\}$ is the Fibonacci series defined from the equality $F\_\{l+1\}=F\{l\}+F\_\{l+1\}$. The recursive functions are recursively expanded to minimize l.

In other embodiments, the invention is manifest in a computer readable program containing code that, when executed by a computer, causes the computer to perform the process steps to design an adder based circuit for an integrated circuit based on a Fibonacci series.

DETAILED DESCRIPTION OF THE PREFERRED EMBODIMENTS

Figure 1:
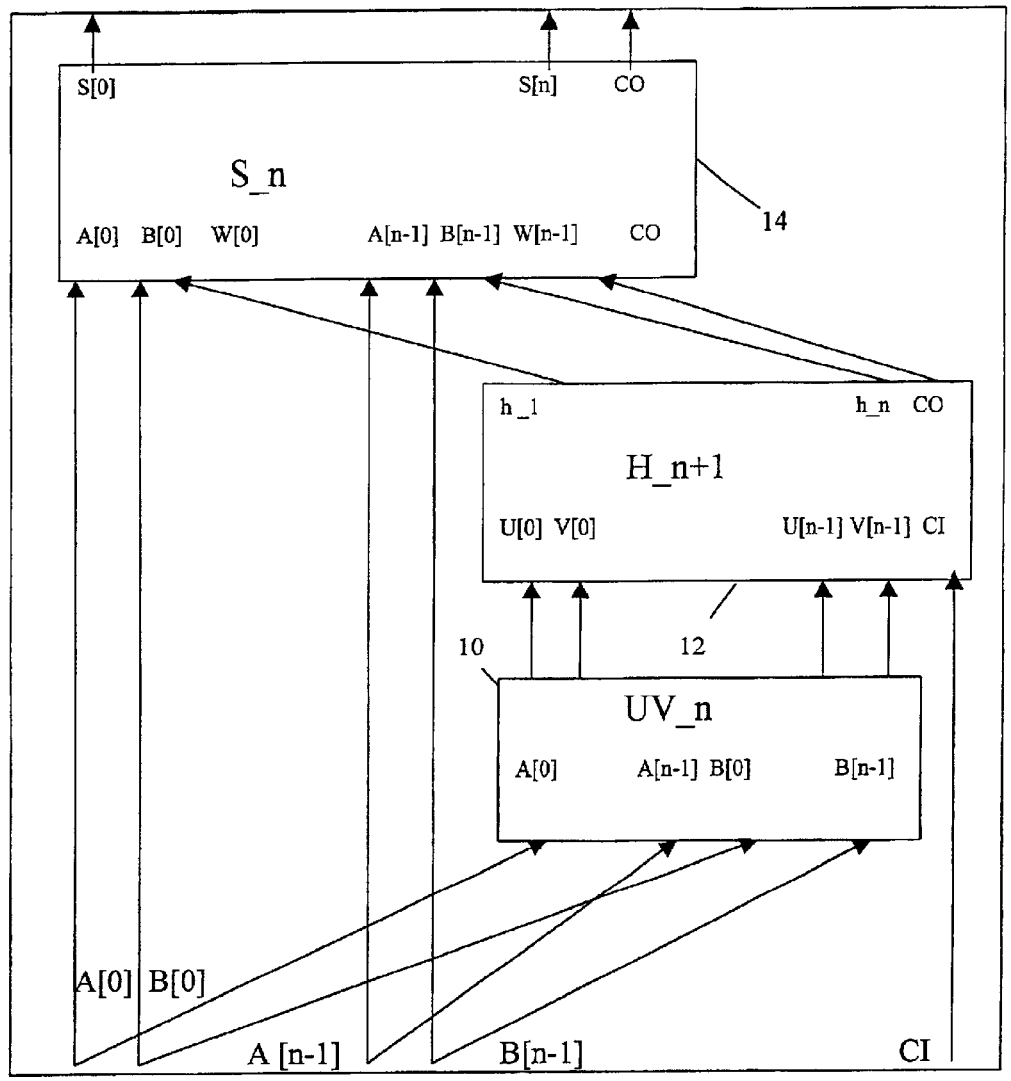
FIG. 1 is a functional diagram of a basic adder circuit according to one embodiment of the present invention.

In the following, Section 1 describes Boolean representations of seven different adder-based circuits are described to demonstrate how they may be implemented from a common adder circuit by modifying the input and/or output modules of an adder according to the present invention. In Section 2, implementation of an adder according to the present invention is described, and Section 3 describes optimization techniques for the adder.

1. Boolean Representations of Arithmetic Circuits
1.1. Adder

An adder is a circuit with inputs $A[0],B[0],\ldots,A[n-1]$, $B[n-1]$ and outputs $S[0],\ldots,S[n]$, such that the sum of numbers $$A = \sum_{i=0}^{n-1} 2^i A[i]$$

and $$B = \sum_{i=0}^{n-1} 2^i B[i]$$

is equal to $$S = \sum_{i=0}^{n} 2^i S[i].$$

In accordance with the present invention, an adder is implemented as three modules: an input module, a carry module, and an output module. The input and/or output modules are optimized based on a global analysis of the Boolean representations of functions to optimize circuit area and depth and reduce delay. The carry module is based on a Fibonacci series.

The input module receives inputs A[i] and B[i] to generate $U[i]=A[i]\&B[i]$ and either $V[i]=A[i]\vee B[i]$ or $V[i]=A[i]\oplus B[i]$. The carry module is responsive to U[i] and V[i] to generate a carry functions W[i]. The output module is responsive to the U[i],V[i] and W[i] to provide an output function S[i].

Considering first a special class of subtractor circuit that subtracts an n-bit number B having bits $(B[n-1],\ldots,B[0])$ from an (n+1)-bit number A having bit $A[n]=1$ and bits $(A[n-1],\ldots,A[0])$, so A>B, the Boolean representation is:

$$\sum_{i=0}^{n-1} 2^i A[i] + 2^n - \sum_{i=0}^{n-1} 2^i B[i] = 2^{n+1} - 1 - \sum_{i=0}^{n-1} 2^i - A[i] - \sum_{i=0}^{n-1} 2^i B[i]$$

$$= 2^{n+1} - 1 - \sum_{i=0}^{n} 2^i S[i]$$

$$= \sum_{i=0}^{n} 2^i - S[i],$$

where symbol $\neg$ denotes logical negation. This special circuit can be obtained from an adder circuit by connecting inverters to inputs $A[0],\ldots,A[n-1]$ of the adder (but not to inputs $B[0],\ldots,B[n-1]$) and by connecting inverters to outputs $S[0],\ldots,S[n]$. The last output, $\neg S[n]$, is equal to 1 if and only if number A, having digits $A[0],\ldots,A[n]$, is greater than or equal to number B, having digits $B[0],\ldots,B[n-1]$, that is, $A \geq B$.

In the aforementioned Gashkov et al. application, we describe a comparator that provides two outputs LT_LE and GE_GT. If the number of bits in A is greater than or equal to the number of bits in B, GE_GT=1. Therefore, if GE_GT=1, $A \geq B$. In an adder, adding digit-by-digit numbers A and B generate a sequence of carries $W[1],\ldots,W[n+1]$, which is recursively calculated as
$W[i+1]=maj(A[i],B[i],W[i])=U[i]\vee V[i]\&W[i]$, where maj(A,B,W) is a majority function, namely
$maj(A,B,W)=A\&B\vee A\&W\vee B\&W=U\vee V\&W=U\oplus P\&W$,
where $U=A\&B$, $V=A\vee B$, $P=A\oplus B$, $W[0]=0$, $W[1]=U[1]$, and $S[i]=A[i]\oplus B[i]\oplus W[i]=P[i]\oplus W[i],P[i]=A[i]\oplus B[i]$, for $1 \leq i \leq n$ and $S[n]=W[n]$. (The function $A\oplus B$ can also be represented by XOR(A,B). The symbol & denotes logical conjunction and the symbol $\vee$ denotes logical disjunction.) By induction, $$W[n](A[O], B[O], \ldots, A[n-1], B[n-1]) =$$
$$\text{h\_n}(U[O], U[1], V[1], \ldots, U[n-1], V[n-1]),$$
$$U[i] = A[i] \& B[i], V[i] = A[i] \vee B[i], 0 \leq i \leq n-1,$$

where the function h_n is determined from equality $$\text{h\_n}(U[0], U[1], V[i], \ldots, U[n-1], V[n-1]) =$$
$$U[n-1]\ldots \vee V[n-1] \& U[n-2] \vee V[n-1] \& V[n-2] \& U[n-3] \vee$$
$$\ldots \vee V[n-1] \& V[n-2] \ldots V[i] \& U[0].$$

(It will be appreciated that the above equality is the same as in the case of the comparator described in the aforementioned Gashkov et al. application.) Usually V[i] will be realized by the function $A[i]\oplus B[i]$.

The carries are calculated as:

$$W[i+1] = W[i+1](A[0], B[0], \ldots, A[i], B[i])$$
$$= \text{h\_}\{i+1\}(U[0], U[1], V[1], \ldots, U[i], V[i]),$$
$$1 \leq i \leq n-1, \text{ and}$$
$$W[1](A[0], B[0]) = \text{h\_}\{i\}(U[0])$$
$$= U[0]$$
$$= A[0] \& B[0].$$

The standard adder will have an additional input CI (input carry) and an additional output CO (output carry). The remaining outputs will realize all digits of the sum $$\sum_{i=0}^{n-1} 2^i A[i] + \sum_{i=0}^{n-1} 2^i B[i] + CI.$$

To include the input carry signal into the adder, it is necessary to change the equality from $S[0]=A[0]\oplus B[0]$ to $$S[0] = A[0] \oplus B[0] \oplus CI \text{ and from}$$

$$W[1] = A[0] \,\&\, B[0] \text{ to}$$

$$W[1] = maj(A[0], B[0], CI)$$

$$= U[0] \vee V[0] \,\&\, CI$$

$$= h\_2(CI, U[0], V[0])$$

and from
$W[i+1]=h\_\{i+1\}(U[0],U[1],V[1],\ldots,U[i],V[i])$, where $1\leq i \leq n-1$
to
$W[i+1]=h\_\{i+2\}(CI,U[0],V[0],\ldots,U[i],V[i])$, where $i=1,\ldots,n-1$.
In particular, the carry at output CO will be
$W[n]=h\_\{n+1\}(CI,U[0],V[0],\ldots,U[n-1],V[n-1])$.

To reduce circuit depth, and hence signal delays, it is preferred to employ an element composed of an OR element and inverter in place of XNOR elements: $XNOR(a,b)=OR(NOT(a),b))$.

1.2. Subtractor

A subtractor circuit is implemented based on the following identities:

$$\sum_{i=0}^{n-1} 2^i A[i] - \sum_{i=0}^{n-1} 2^i B[i] - CI = 2^n - 1 - \sum_{i=0}^{n-1} 2^i - A[i] - \sum_{i=0}^{n-1} 2^i B[i] - CI$$

$$= 2^{n+1} - 1 - \sum_{i=0}^{n} 2^i S[i] - 2^n$$

$$= \sum_{i=0}^{n} 2^i - S[i] - 2^n \text{ which}$$

$$= \sum_{i=0}^{n-1} 2^i - S[i] - 2^n, \text{ if } S[n] = 1 \text{ and}$$

$$= \sum_{i=0}^{n-1} 2^i - S[i], \text{ if } S[n] = 0.$$

The subtractor can be obtained from an adder by attaching inverters to inputs $A[0],\ldots,A[n-1]$ (but not to inputs $B[0],\ldots,B[n-1],CI$) and by attaching inverters to outputs $S[0],\ldots,S[n]$. Topologically the circuit can be kept the same if XOR elements on outputs of the circuit are replaced with XNOR instead of adding the inverters. As mentioned above, however, it is preferred to employ $OR(NOT(a),b)$ in place of the XNOR element.

1.3. Adder-subtractor

An adder-subtractor circuit is one having an additional input ADD_SUB. If ADD_SUB=0, the circuit operates as an adder; if ADD_SUB=1, the circuit operates as a subtractor. To construct the circuit inputs $A[i]$, $i=0,\ldots,n-1$ and all outputs of the adder are connected through additional XOR elements, with each additional XOR element having a common input ADD_SUB. If ADD SUB=0, the circuit will operate in the adder function because the additional XOR elements will simply pass the state of the input $A[i]$ and output $S[i]$ bits. If ADD_SUB=1, the circuit will operate as a subtractor because the additional XOR elements will operate as inverters. The complexity of the circuit will increase by $2n+1$ and the depth will increase by 2 when compared with an adder.

1.4. Incrementor

An incrementor with n inputs $A[0],\ldots,A[n-1]$ can be represented as $$\sum_{i=0}^{n} 2^i S[i] = \sum_{i=0}^{n-1} 2^i A[i] = 1.$$

Therefore an incrementor is a simplification of an adder, with the second operand is equal to constant 1. If numbers A and B are added in sequence a sequence of carries $W[0],\ldots,W[n]$, is recursively calculated based on
$W[i]=U[i]\vee V[i]W[i-1]$, $i>0$, $W[0]=U[0]$ where
$U[i]=A[i]\,\&\,B[i]$, $W[i]=A[i]\vee B[i]$ and the output functions are
$S[i]=A[i]\oplus B[i]\oplus W[i-1]$, $1\leq i \leq n$, and
$S[0]=A[0]\oplus B[0]$, $S[n]=W[n]$.

The sequence of the carries is calculated as $W[0]=A[0]$, $W[i]=A[i]$, $W[i-1]=A[i],\ldots,A[0]$, for $i=1,\ldots,n-1$. The outputs represent the functions $S[0]=\neg A[0]$, $S[i]=A[i]\oplus W[i-1]$, for $i=1,\ldots,n-1$, and $S[n]=W[n-1]$, because vector $(B[0],\ldots,B[n-1])=(1,0,\ldots,0)$. Therefore the incrementor can be implemented by using the input module of the adder providing the conjunctions $W[i]=A[i]\,\&\,\ldots\,\&\,A[0])$ and the output module of the adder. The carry module is modified by simply coupling the outout of the input module to the XOR elements of the output module.

It is possible to reduce the delay of this incrementor circuit by using negation instead of conjunctions for W[i], using XOR elements at the outputs instead of XNOR elements, and forming the input circuits of OR elements with outputs coupled to NAND elements of the adder. One technique for distributing negations is described in the aforementioned Gashkov et al. application.

It is possible to further reduce delay by duplicate elements of the circuit so that elements performing negation functions are adjacent the corresponding elements and the circuit will be constructed only using elements NAND and NOR. One of the two mutually-inverse duplicate elements (having minimum delay) is selected and elements that are useless can be deleted from the circuit. The delay can be further reduced if the multiple input elements NAND and NOR are used.

1.5. Decrementor

A decrementor is similar to the subtractor with the second operand equal to a constant 1. To implement a decrementor, a subtractor is arranged to subtract from the number $$A = \sum_{i=0}^{n-1} 2^i A[i]$$

by negation on the inputs and output, as if $$\sum_{i=0}^{n} 2^i S[i] = \sum_{i=0}^{n-1} 2^i A[i] + 1$$

that $$\sum_{i=0}^{n} 2^i - S[i] = 2^{n+1} - 1 - \sum_{i=0}^{n} 2^i S[i] = 2^{n+1} - 1 - \sum_{i=0}^{n-1} 2^i A[i] + 1$$

$$= 2^n + \sum_{i=0}^{n-1} 2^i - A[i] - 1.$$

The decrementor is implemented similar to the incrementor, and it is not necessary to connect inverters with inputs as is necessary for the subtractor. Nor is it necessary to connect inverters to the output of circuit. Instead, the decrementor is formed by replacing the XNOR elements of the incrementor with XOR elements. Hence, decrementor and incrementor circuits have identical topology and can be composed from the dual elements in the aforementioned Gashkov et al. application to realize the dual functions.

1.6. Incrementor-decrementor

The incrementor-decrementor is a circuit having an additional input s. If s=0 the circuit operates as an incrementor; if s=1 the circuit operates as a decrementor. To construct this circuit, the inputs and outputs of incrementor are connected through additional XOR elements, each having a common input S. If s=0, the circuit will operate as an incrementor because the additional XOR elements will simply pass the state of the input A[i] or S[i] bits, respectively. If s=1 the circuit will operate as a decrementor because the additional XOR elements will operate as inverters. The complexity of the incrementor-decrementor circuit will increase by 2n and the depth will increase by 2, as compared to an incrementor.

1.7. Absolute Value Calculator

By convention, the sign bit of a signed number is the most significant bit (n−1). If the n−1 bit is a "1", the number is considered negative; if the n−1 bit is a "0", the number is considered nonnegative. For an absolute value calculator, if the sign bit A[n−1]=0, the circuit simply passes inputs to outputs without any changes. If the sign bit A[n−1]=1, the circuit calculates the digits of number as $$2^n - \sum_{i=0}^{n-1} 2^i A[i] = 1 + \sum_{i=0}^{n-2} 2^i - A[i].$$

Therefore, the absolute value calculator operates as an incrementor with inverters on the n−1 inputs. The circuit is topologically the same as the incrementor. The outputs are connected to multiplexers controlled by the input A[n−1] so if A[n−1]=0, the multiplexer outputs are passed without change. If A[n−1]=1, the multiplexer causes the outputs of the incrementor to be passed. The complexity of the absolute value calculator circuit is increased on the n−1 path, and depth increases by 1 over the incrementor.

2. Implementation of an Adder

FIG. 1 illustrates an adder circuit consisting of three modules: input module 10, carry module 12 and output module 14. Input module 10 performs the functions U[i]=A[i]&B[i] and V[i]=A[i]∨B[i], for 0≦i≦n−1.

Figure 2A:
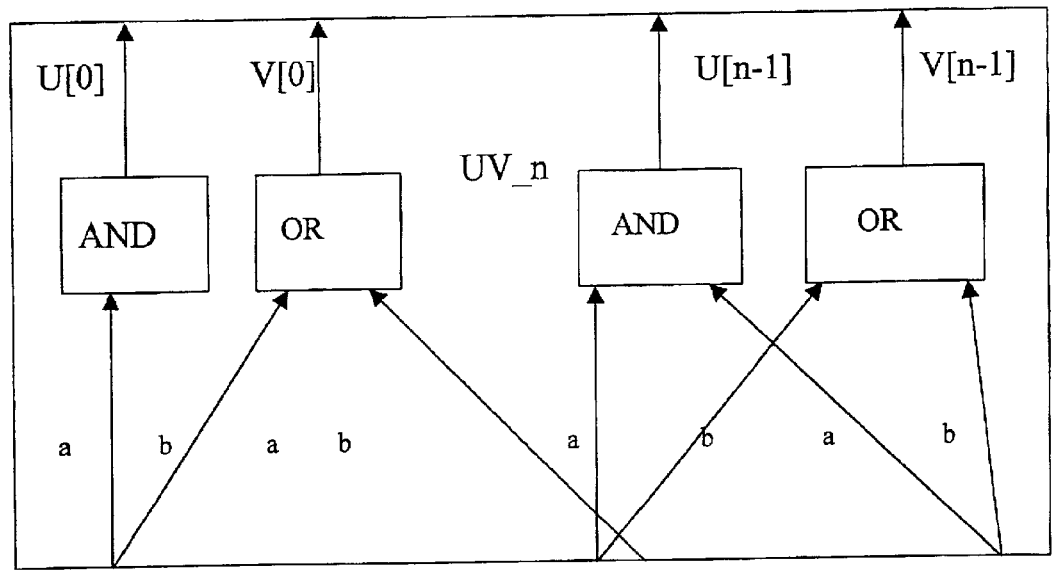
FIGS. 2A and 2B are functional diagrams of the input and output modules of the circuit shown in FIG. 1.

Instead of A[i]∨B[i], it is also possible to use A[i]⊕B[i], in which case U[i] and V[i] can be simultaneously realized by a half-adder element. One embodiment of input module 10 is illustrated in greater detail in FIG. 2A as including AND elements 16 and OR elements 18.

Output module 14 provides the output functions of the adder of

S[i] = A[i]⊕B[i]⊕W[i]

Figure 2B:
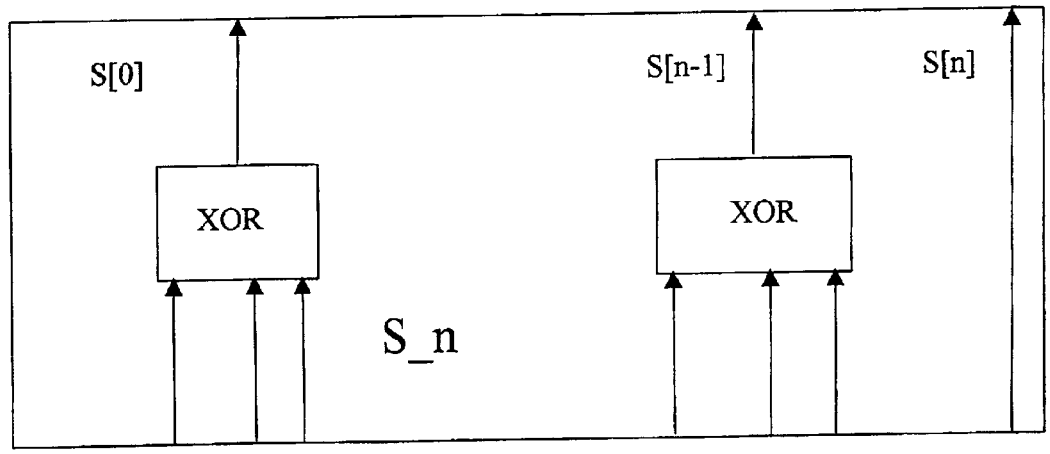

= P[i]⊕W[i], where P[i] = A[i]⊕B[i], for 1≦i≦n, S[n]=W[n]. In one embodiment shown in FIG. 2B, the output circuit consists of 3-input XOR elements EO3 (a,b,c)=a⊕b⊕c. It is possible to apply 2-input XOR elements EO(a,b)=a⊕b=XOR(a,b) for optimization if a half-adder is used for input module 10. In such a case P[i]=A[i]⊕B[i] has already been implemented at the input module, and the output module comprises EO(a,b) elements to perform the function S[i]=P[i]⊕W[i].

Figure 3:
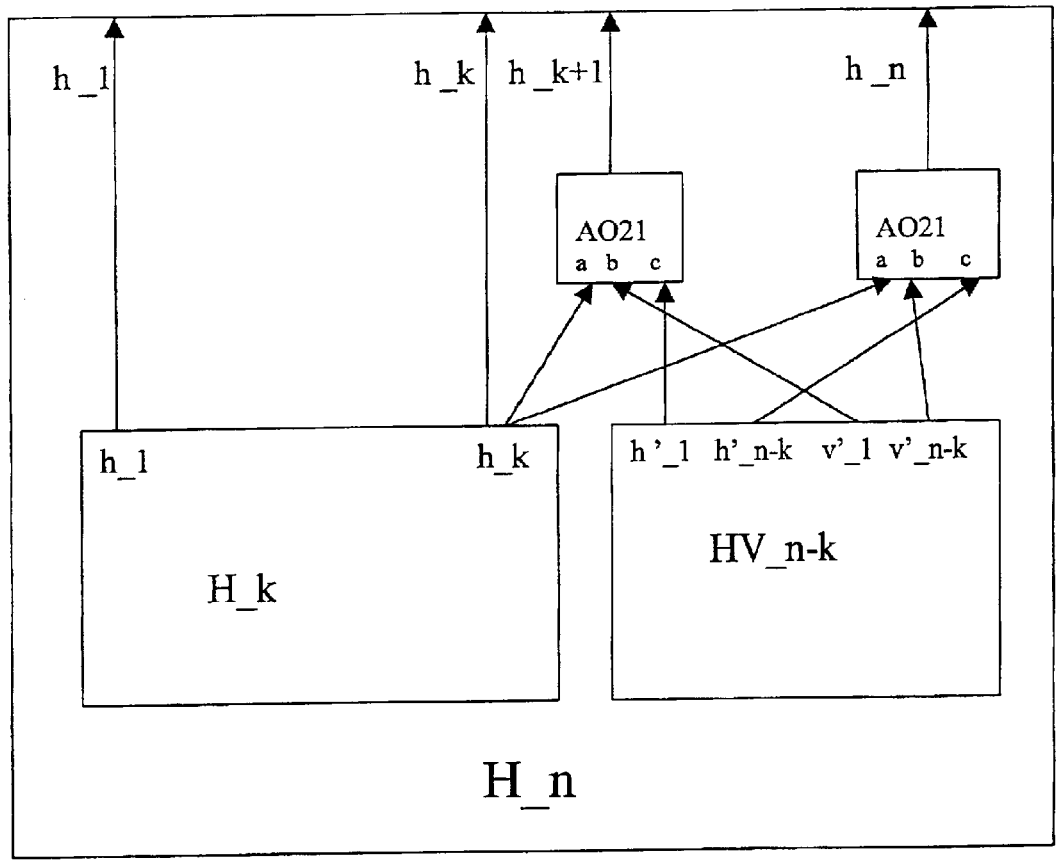
FIG. 3 is a functional diagram of a carry module according to one embodiment of the present invention for use in the circuit shown in FIG. 1.

The principal module of the adder is carry module 12 which realizes functions h_1, . . . ,h_{n+1}. For sake of brevity n will be used instead of n+1 and carry module 12 will be denoted as h_n. Recursive generation of the carry module H_n={h_1, . . . ,h_n} is based on application of identities h_{k+1}=h'_1∨v'_1&h_k=AO21(v'_1,h_k,h'_1), where h'_1=h_1(U[k+1],U[k+2],V[k+2], . . . ,U[k+1],V[k+1]), and v'_{l}=v_{l,k}=V[k+1]& . . . &V[k+1] for l=1, . . . ,n−k. As shown in FIG. 3, in one form module H_n consists of modules H_k={h_1, . . . ,h_k} and HV_{n−k}={h'_1,v'_1, . . . ,h'_{n−k},v'_{n−k,}} and also their connecting modules AO21 that performs the function AO21(a,b,c)=(a&b)∨c, shown in FIG. 4.

Figure 4:
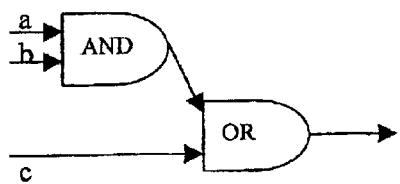
FIG. 4 is a functional diagram of a subcircuit used in the carry module shown in FIG. 3.
Figure 5:
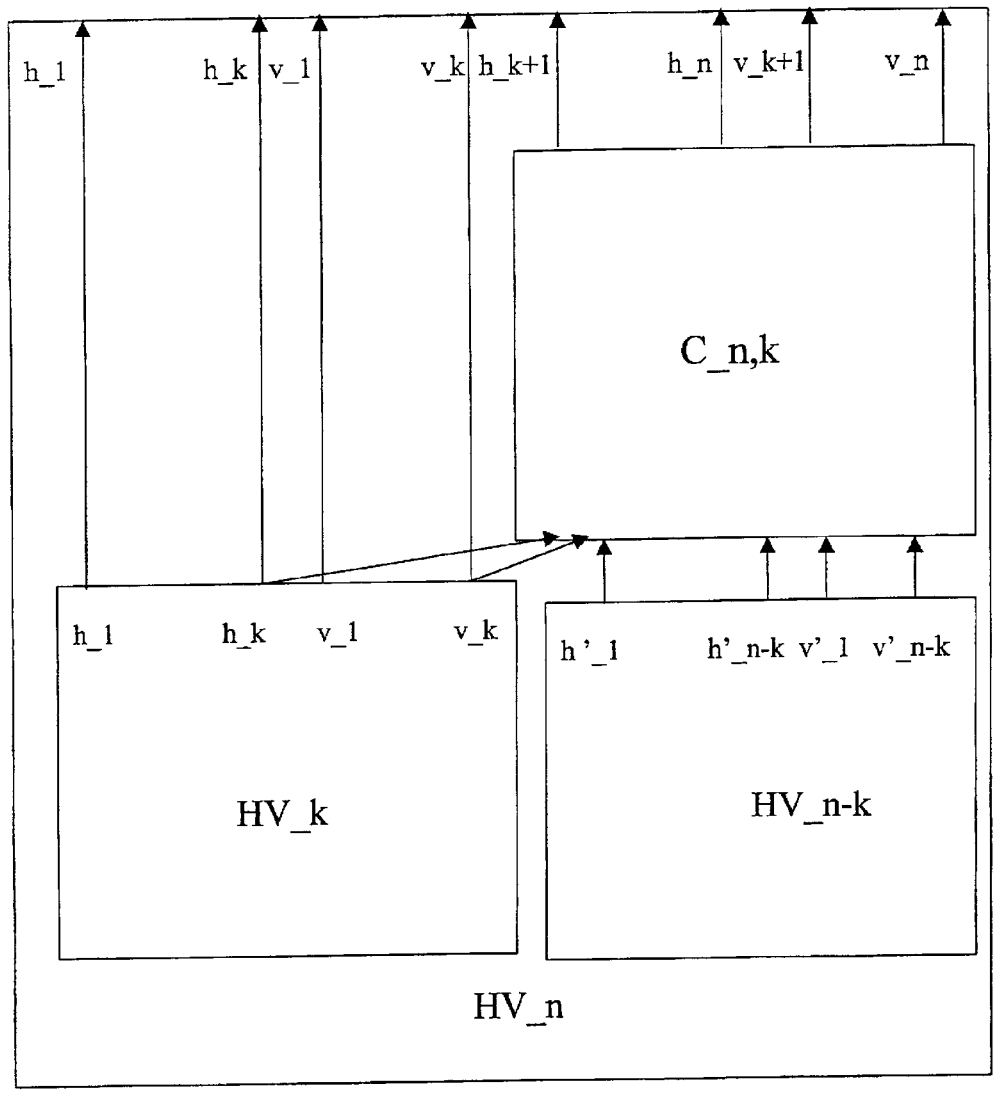
FIG. 5 is a functional diagram of a carry module according to another embodiment of the present invention for use in the circuit shown in FIG. 1.
Figure 6:
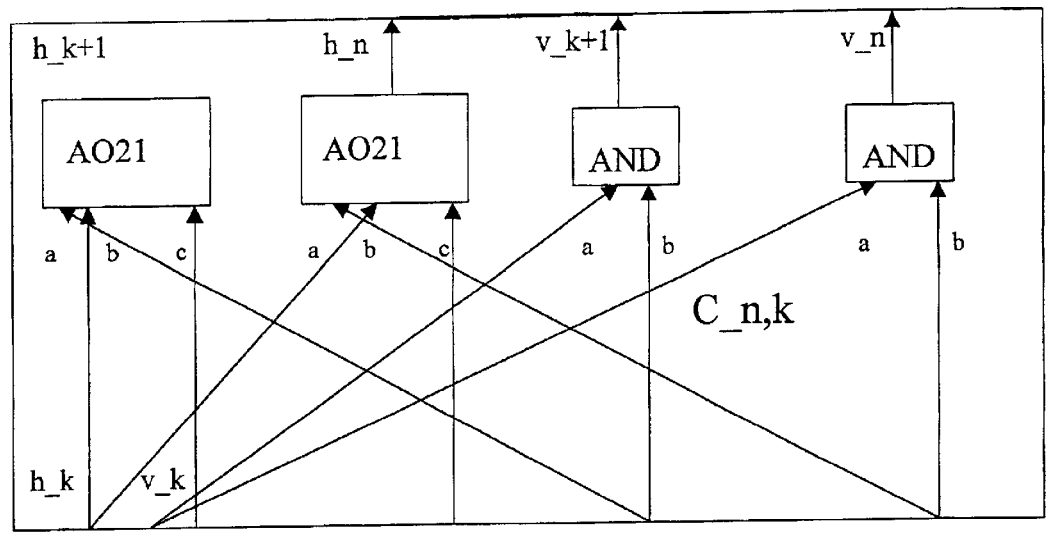
FIG. 6 is a functional diagram of one embodiment of a subcircuit used in the carry module shown in FIG. 5.

A carry module, shown in FIG. 5 and designated HV_n, derives carries simultaneously with conjunctions {h_1, v_1, . . . ,h_n,v_n}, where v_k=v_{k,n}=V[n]& . . . &V[n−k+1]. Carry module HV_n is recursively generated from modules HV_k=h_1,v_1, . . . ,h_k,v_k and HV_{n−k}=h')1,v'_1, . . . ,h'_{n−k},v'_{n−k} and their connecting module C_n,k. Module C_n,k is shown in greater detail in FIG. 6 consisting of elements AND and AO21 (FIG. 4), due to identities H_{k+1} = h'_1 ∨ v'_ & h_k = AO21(v'_1, h_k, h'_1), h'1 = h_1 = (U{k+1}, U[k+2, V[k+2], … , U{k+1}, V[k+1], v'_1 = v_{l, k} = V[k+1] & … & V[k+1], for l = 1, … n−k V_{k+l} = v_{l, k} & v_k = (V[k+l] & … & V[k+1]) & (V[k] & … & V[1])

= V[k+l] & … & V[1].

The optimal choice of parameter k on each step of the recursion for the purpose of minimizing depths of a circuit is the same as for a comparator described in the aforementioned Gashkov et al. application. More particularly, k is selected from the closed interval between F_i to n−F_{i−1}=F_i, where F_i is a number selected from a Fibonacci series. Most particularly, the circuit depth is minimized by selecting k so that k>F_1, n−k≦F_{l−1}, where the number l satisfies F_l<n<F_{l+1}, and the Fibonacci series F_l is defined recursively from the equality F_{l+1}=F_l+F_{l−1} using initial values F_1=1, F_0=0. The value of k is determined uniquely when n is equal to a Fibonacci number; in other cases k is selected from a series of natural numbers [n−F_{l−1},F_1]. k may be selected arbitrarily from this series.

As in the convention adopted in the aforementioned Gashkov et al, application, if k is selected as the left extremity of a series (least allowable value), the circuit is referred to as a left-side circuit; if k is selected as the right extremity of this series (greatest allowable value), the circuit is called right-side circuit. Also as described in the Gashkov et al. application, it is possible to distribute negations and execute other technological mapping techniques to derive 2-input elements in place of 3-input elements forming circuits that are topologically the same based on the following identities $$h\_\{k+1\} = \neg (\neg h'\_l) \lor v'\_l \& h\_k$$
$$= NAND(\neg h'\_l, ND(v'\_l, h\_k)),$$
$$\neg h\_\{k+1\} = \neg (h'\_l \lor v'\_l, h\_k)$$
$$= AO6(v'\_l, h\_k, h'\_l), \text{ and}$$
$$V\_\{k+1\} = v\_\{l, k\} \& v\_k, \text{ where}$$
$$AO6 (a, b, c) = NOR(AND(a, b), c).$$

In addition to using elements to form OR(NOT(a),b) in place of XNOR(a,b) elements, it is preferred to employ NOR and NAND elements instead of monotone OR and AND elements to reduce circuit depth and delay.

3. Optimization Techniques
3.1. Distribution of Negations

For brevity symbol f^σ designates the function f or its negation depending on whether σ=1 or 0. A circuit with two outputs that realizes functions h^α__n and v^β__n may be defined as h^αv^β, where α=0,1 and β=0, 1.

Figure 7A:
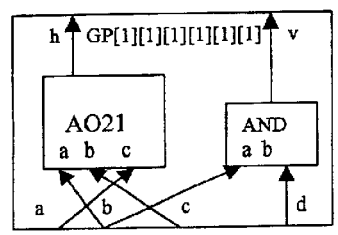
FIGS. 7A and 7B are functional diagrams of circuits used in the subcircuit of FIG. 8.
Figure 7B:
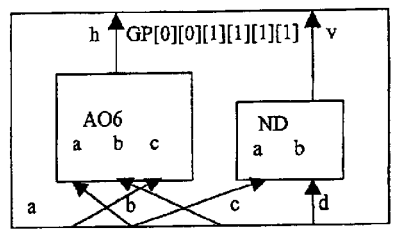
Figure 8:
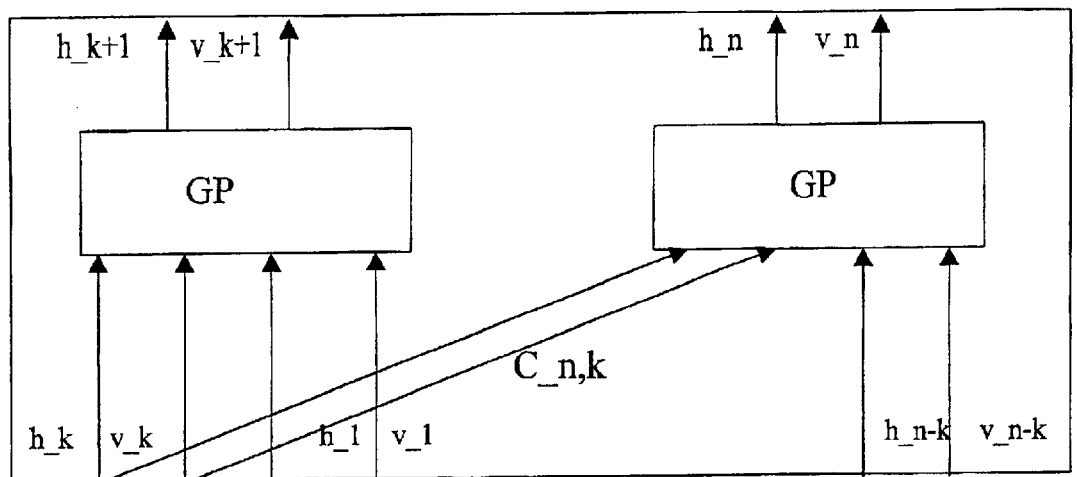
FIG. 8 is a functional diagram of another embodiment of a subcircuit used in the carry module shown in FIG. 5.

GP[α__1][α__2][β__1][β__2][β__3][β__4] designates a module with two outputs h and v and four inputs a, b, c, d, realizing functions AO21^{α__1}(b^{β__2}, c^{β__3}, a^{β__1}), AND^{α__2}(b^{β__2}, and d^{β__4}), where AO21(a,b,c)=OR(AND(a,b),c) (FIGS. 4 and 7B). For each of 64 modules, the optimal implementation is selected based on area or delay. As another example, module GP[0][0][1][1][1][1] may consist of elements AO6 and NAND, where AO6(a,b,c)=NOR(AND(a,b),c). See FIG. 7B. FIG. 8 illustrates a connecting module GP.

A module H^{α__1}V^{α__2}__n may be defined to provide functions h^{α__1{__n and V^{α__2}__n, where α__1= 0,1 and α__2=0,1, and functions h__1,v__1, . . . ,h__{n-1}, v{n-1}. This module is generated recursively from modules H^{β__1}V^{β__2}__{k}, and H^{β__3}V^{β__4}__{n-k}, and their connecting module GP[α__1][α__2][β__1][β__2] [β__3][β__4]. Similarly, a module H^α__n as may be defined to provide function h^α__n, where α=0,1 and functions h__1, . . . ,h__{n-1}. This module is recursively generated from modules H^{β__1}V^{β__2}__k and H^{β__3}__{n-k} and their connecting module AO[α][β__1][β__2][__3].

The optimal distribution of negations is carried out as described in the aforementioned Gashkov et al. application.

3.2. Minimization of Adder Depth

Adders are frequently used as the internal modules in the more complicated circuits, such as multipliers. To calculate the depth of outputs of the adder located as an internal module in a larger circuit, it is not practical to assume that the depth of the adder inputs is equal to zero.

The depths of inputs A[0],B[0], . . . ,A[n-1],B[n-1] of the adder are defined as a__0, b__0, . . . ,a__{n-1}, b__{n-1}. The depth of the element providing functions U[i]=A[i]&B[i] and V[i]=A[i]∨B[i], for 0≦i≦n-1, is equal to U__i=max{a__i, b__i}+1, for 0≦i≦n-i. Therefore, the problem of minimizing the depth of an adder is reduced to one of minimizing the depth of circuit HV__n, realizing all functions h__1,v__1, . . . ,h__n,v__n.

Minimization of the depth of circuit HV__n is carried out by considering U[i]=1, for 0≦i≦n-i with the help of the optimal choice of parameter k in each step of recursive construction of HV__n from modules HV__{k}, HV__{n-k} and their connecting modules. The connecting modules consist of the parallel modules GP which are assumed, for example, to be formed from 2-input elements.

DH__n is the maximum depth of all the outputs of module HV__n, and Dh__n is the depth of the output of module HV__n that realizes function h__n. A dynamic programming algorithm is applied to minimize the depth, based on the recursive application of the formulas $$DH\_n=\min\{\max\{DH\_\{n-k\}+1,Dh\_k+2,DH\_k\}\},$$
$$Dh\_n=\min\{\max\{Dh\_\{n-k\}+1,Dh\_k+2\}\},$$

where DH__k and Dh__k are calculated for vectors of depths U__i, for 0≦i≦k-1, and DH__{n-k} and Dh__{n-k} are calculated for vectors of depths U__i, for k≦i≦n-1. If the minimum value of both DH__n and Dh__n are achieved for the same value of parameter k, that value is selected. Otherwise (if the minimum value of both DH__n and Dh__n are achieved for different values of parameter k), it is possible to accelerate the algorithm (at the expense of a possible diminution of exactitude) by always selecting the smallest value of k.

If exactitude is necessary, a vector DHn__n=(DH__n,Dh__n) is calculated during each step of recursion on the earlier calculated vectors Dh__{n-k},DHh__k. The calculation employs the formulas DH__n=max{DH__{n-k}+1,Dh__k+ 2,DH__k} and Dh__n=max{Dh__{n-k}+1,Dh__k+2} for the components of vector DHh__n. The values k are sorted to derive a set of minimum vectors DHh__n (concerning the relation of component-wise comparison). In further steps of the recursion, a search is conducted for a set of minimum vectors. The search examines all values of parameter k as well as all minimum vectors DHh__{n-k},DHh__k obtained on the previous step of recursion.

Vector DHh__k is recursively calculated for each k-dimension subvector (u__a, . . . ,u__{b+k-1}) to calculate sequences of vectors DHh__n for a specific vector (u__0, . . . ,u__}n-1}). In the simplest implementation of this algorithm the memory is equal to $O(n^2)$, and the complexity is equal to $O(n^3)$.

3.3. Minimization of Adder Fanout Depth

If the depth of a circuit is defined as the length of its maximum chain of elements in which the adjacent elements are connected to one another, the fanout depth can be defined as the maximum sum of fanouts of elements of such circuits, where the fanout of an element E is the number of elements having inputs connected to an output of element E. The delay of element E depends on the total capacitance of the indicated elements connected to it. The delay of circuit with given depth will be less if the fanout depth is less. Therefore to minimize the delay of a circuit, the fanout depth should also be minimized.

Smaller fanout depth can be achieved by changing the adder implementation approach (described in the previous section). The following describes implementation of an adder with smaller fanout depth, without changing the depth and only minimal increase in circuit area.

Consider a system of functions $$HV^\wedge k\_n = \{h^\wedge l\_k, v^\wedge l\_k, \ldots, h^\wedge\{n-k+l\}\_k, v^\wedge\{n-k+1\}\_k\},$$

where $h^\wedge i\_k = h\_k(U[i-1], U[i], V[i], \ldots, U[i+k-2],$ $V[i+k-2]), v^\wedge i\_k = V[i-1] \& V[i] \& \ldots \& V[i+k-2].$ It is possible to recursively construct circuit HV^k__n from modules HV^m__{n-(k-m)} and HV^{k-m}__{n-m} and their connecting module, consisting of parallel located modules GP, based on the expansions $$H\hat{\ }i\_k = h\_k(U[i-1], U[i], V[i], \ldots, U[i+k-2], V[i+k-2])$$
$$= h\hat{\ }\{i+m\}\_\{k-m\} \vee v\hat{\ }[i+m]\_\{k-m\} \& h\hat{\ }i\_m,$$
$$v\hat{\ }i\_m = V[i-1] \& V[i] \& \ldots \& V[i+k-2]$$
$$= v\hat{\ }\{i+m\}\_\{k\hat{\ }m\} \& v\hat{\ }i\_m.$$

Figure 9:
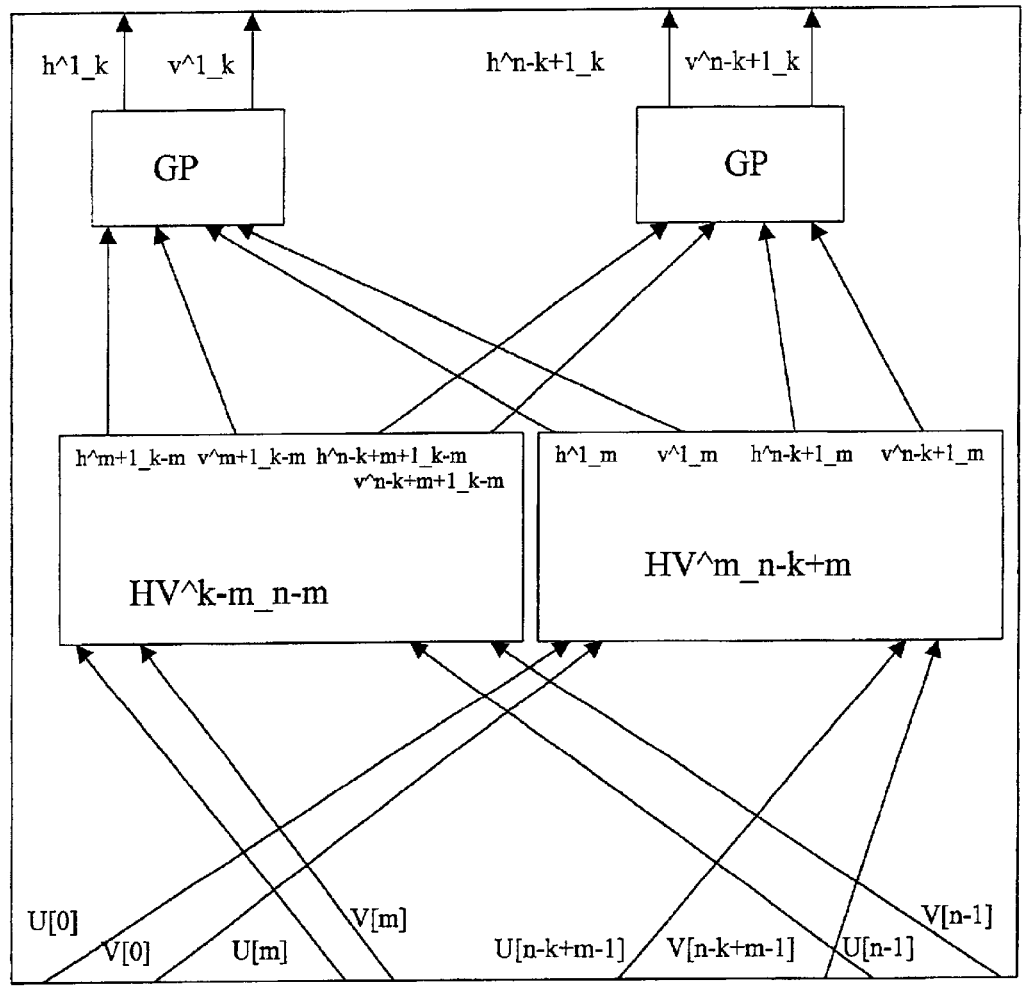
FIGS. 9 and 10 are functional diagrams of other embodiments of carry modules used in the adder based circuit illustrated in FIG. 1
Figure 10:
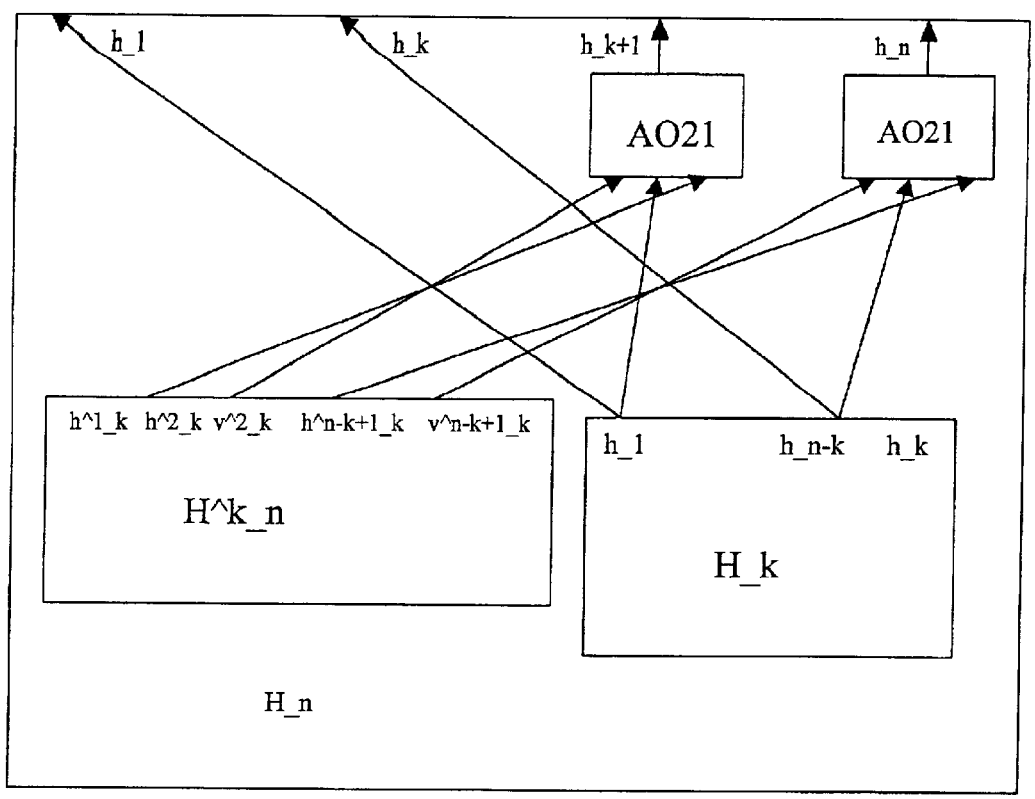

The resulting circuit is illustrated in FIG. 9. If k=F_l, the number m in the next step of a recursion can be selected as F_{l-1}, where {F_l} is the Fibonacci series. Then using mathematical inductions, the depth of circuit HV^k_n will be equal to l-1, fanout-depth will be equal to 3l-5, and the complexity of this circuit (the number of elements) is equal to 3n(l-2).

Fanout of each element realizing the function v^i{F_j} is equal to 3, and fanout of elements realizing the functions h^i_{F_j} is equal to 2. Each step of the recursion is performed using the same algorithm described in the aforementioned Gashkov et al. application to minimize parameter m. The circuit H_n is constructed recursively from modules H_K and HV^k_n and their connecting module, consisting of parallel located modules GP, founding on the expansion $$h\_i = (U[0], U[1], V[1], \ldots, U[i-1], V[i-1])$$
$$= h\hat{\ }\{i-k+1\}\_k \vee v\hat{\ }\{i-k+1\}\_k \& h\_\{i-k\}, i > k.$$

The depth of this circuit can be calculated as $$DH\_n = \max\{DHV\hat{\ }k\_n+1, DH\_\{n-k\}+2\},$$

and fanout-depth can be calculated based on a similar formula. The complexity of this circuit can be calculated from L(n)=3n(l-2)+L(k), where
   k=F_l<n≦F_{l+1}, for F_l Fibonacci numbers. Therefore, the asymptotic inequality $$L(n) < 3(2+\phi)n \log\_\phi(n),$$

is obtained, where $\phi=(\sqrt{5+1})/2$ is an irrational number.

The adder based circuit is constructed using 2-input elements mapped from 3-input elements of a standard cell library. In the event 4-input elements are needed (as described in the aforementioned Gashkov et al. application), they may be constructed from 2-input elements.

The present invention thus provides an adder based circuit embodied in an integrated circuit. The adder includes an input module, a carry module and an output module. The carry module has a minimum depth defined by a recursive expansion of at least one function associated with the carry module based on a variable k derived from a Fibonacci series. Through use of invertor elements, XOR elements, XNOR elements and multiplexers selectively coupled to the input and output modules, the adder based circuit can be configured to function as a subtractor, adder-subtractor, incrementor, decrementor, incrementer-decrementor or absolute value calculator.

The process of designing the adder based circuit includes defining at least one carry function of the carry module of the adder based circuit in terms of a Fibonacci series, and recursively expanding the carry function to find a minimum parameter of the Fibonacci series. Optimization of depth and delay of the adder based circuit are achieved.

In one form, the invention is carried out though use of a computer programmed to carry out the process. A computer readable program code is embedded in a computer readable storage medium, such as a disk drive, and contains instructions that cause the computer to carry out the steps of the process of designing a Fibonacci circuit in the form of a adder based circuit, including adders, subtractors, adder-subtractors, incrementors, decrementors, incrementor-decrementors and absolute number calculators.

Although the present invention has been described with reference to preferred embodiments, workers skilled in the art will recognize that changes may be made in form and detail without departing from the spirit and scope of the invention.

What is claimed is:

1. An adder based circuit embodied in an integrated circuit comprising
   an input module responsive to inputs A[i] and B[i] to generate a first input function U[i]=A[i]&B[i] and a second input function V[i]=A[i]∨B[i] or V[i]=A[i]⊕B[i];
   a carry module responsive to the first and second input functions to generate carry functions; and
   an output module responsive to the first and second input functions and the carry function to provide an output function $$S = \sum_{i=0}^{n} 2^i S[i] = \sum_{i=0}^{n-1} 2^i A[i] + \sum_{i=0}^{n-1} 2^i B[i],$$

wherein the carry module has a minimal depth defined by a recursive expansion of at least one function associated with the carry module based at least in part on a parameter k, where k≧F_l and n-k≦F_{l-1} and where l satisfies F_l<n≦F_{l+1}, F_{l-1}, F_l and F_{l+1} are members of a Fibonacci series and n is the number of bits of at least one of the inputs.

2. The adder based circuit of claim 1, including one or more elements coupled to at least one of the inputs of the input module and outputs of the output module so that the circuit performs a function selected from the group comprising subtractors, adder-subtractors, incrementors, decrementors, increment-decrementors and absolute value calculators.

3. The adder based circuit of claim 2, wherein the elements are selected from the group comprising inverter elements, exclusive or elements, exclusive nor elements and multiplexers.

4. A process of designing an adder based circuit for an integrated circuit comprising steps of:
   a) defining an input module of the adder based circuit having an n-bit input;
   b) defining at least one carry function of a carry module of the adder based circuit using conjunction elements; and
   c) recursively expanding the carry function to find a minimum parameter, k, where k≧F_l and n-k≦F_{l-1}, l satisfies F_l<n≦F_{l+1}, and F_{l-1}, F_l and F_{l+1} members of a Fibonacci series.

5. The process of claim 4, wherein the recursive functions are selected from the group consisting of HV_{n-k}={h'_1,v'_1, . . . ,h'_{n-k},v'_{n-k},} and either (i) H_k={h_1, . . . ,h_k} or (ii) HV_k=h_1,v_1, . . . ,h_k,v_k and HV_{n-k}=h'_1,v'_1, . . . ,h'_{n-k},v'_{n-k}, where v_k=V_n]& . . . &V[n-k+1].

6. The process of claim 4, wherein the carry module includes negation elements and the process further includes a step of:

c) optimizing a distribution of negation elements in the carry module.

7. The process of claim 6, wherein step (c) comprises, for each portion of the carry module, steps of:
   c1) identifying a set of delay vectors,
   c2) recursively comparing the delay vectors to derive a set of minimum vectors, and
   c3) selecting a vector with a minimum norm from the set of minimum vectors.

8. The process of claim 4, further including a step of:
   c) minimizing a depth of the adder based circuit.

9. The process of claim 8, wherein step (c) comprises:
   c1) recursively expanding expressions $$DH\_n = \min\{\max(DH\_\{n-k\}+1, Dh\_k+2, DH\_k)\}. \text{ and}$$

$$Dh\_n = \min\{\max(Dh\_\{n-k\}+1, Dh\_k+2)\}$$

where $DH\_k$ and $Dh\_k$ are based on vectors of depths $U[i]$ for $0 \leq i \leq k-1$ and $DH\_\{n-k\}$ and $Dh\_\{n-k\}$ are based on vectors for $k \leq i \leq n-1$, and c2) selecting a value of k based on a minimum of at least one of $DH\_n$ and $Dh\_n$.

10. The process of claim 9, wherein step (c2) comprises steps of
    calculating vectors $DHh\_n$ based on maximum values of $DH\_n$ and $Dh\_n$,
    sorting values of k to derive a set of minimum vectors $DHh\_n$, and
    searching the set of minimum vectors to select a value of k.

11. The process of claim 4, further including a step of:
    c) minimizing fanout depth of the adder based circuit.

12. The process of claim 11, wherein step (c) comprises steps of:
    c1) defining recursive functions $$H'i\_k = h^\{i+l\}\_\{k-l\} \vee v^\{i+l\}\_\{k-l\} \& h'i\_l$$

and $$v'i\_l = v^\{i+l\}\_\{k'l\} \& v'i\_l$$

based on a function of the adder based circuit, where $k = F\_l$ and $n-k = F\_\{l-1\}$, $l$ satisfies $F\_l < n \leq F\_\{l+1\}$, $\{F\_l\}$ is the Fibonacci series defined from the equality $F\_\{l+1\} = F\{l\} + F\_\{l+1\}$ and $n$ is the number of bits of an input to the adder based circuit, and c2) recursively expanding the recursive functions to minimize l.

13. The process of claim 4, wherein step (b) comprises steps of:
    b1) defining recursive functions $h'\_l = h\_1(U[k+1], U[k+2], V[k+2], \ldots, U[k+1], V(k+1))$ and $v'\_l = V[k+1] \&, \ldots, \& V[k+1]$,
    where $l = 1, \ldots, n-k$ and $U[i]$ and $V[i]$ are inputs to the carry module, $k = F\_l$ and $n-k = F\_\{l-1\}$, $l$ satisfies $F\_l < n \leq F\_\{l+1\}$, $\{F\_l\}$ is the Fibonacci series defined recursively from the equality $F\_\{l+1\} = F\{l\} + F\{l+1\}$ and $n$ is the number of bits of an input to the carry module, and
    b2) recursively expanding the recursive functions to minimize l.

14. A storage medium having stored therein
    first processor executable instructions that enable a processor to define an adder based circuit structure for an integrated circuit comprising elements that define at least one output function in terms of a Fibonacci series; and
    second processor executable instructions that enable the processor to recursively expand the output function to find a minimum parameter, k, where $k \geq F\_l$ and $n-k \leq F\_\{l-1\}$, $l$ satisfies $F\_l < n \leq F\_\{l+1\}$, and $F\_\{l-1\}$, $F\_l$ and $F\_\{l+1\}$ are members of a Fibonacci series.

15. The storage medium of claim 14, wherein the circuit structure defined by the processor includes a carry module and the second processor executable instructions comprises:
    processor executable instructions that enable the processor to define recursive functions $h'\_l = h\_1(U[k+1], U[k+2], V[k+2], \ldots, U[k+1], V[k+1])$ and $V'\_l = V[k+1] \&, \ldots, \& V[k+1]$, based on a carry function of the carry module, where $k = F\_l$ and $n-k = F\_\{l-1\}$, $l$ satisfies $F\_l < n \leq F\_\{l+1\}$, $\{F\_l\}$ is the Fibonacci series defined recursively from the equality $F\_\{l+1\} = F\{l\} + F\_\{l+1\}$ and n is the number of bits of an input to the carry module, and
    processor executable instructions that enable the processor to recursively expand the recursive functions to minimize l.

16. The storage medium of claim 15, wherein the recursive functions are selected from the group consisting of $HV\_\{n-k\} = \{h'\_1, v'\_1, \ldots, h'\_\{n-k\}, v'\_\{n-k,\}\}$ and either (i) $H\_k = \{h\_1, \ldots, h\_k\}$ or (ii) $HV\_k = h\_1, v\_1, \ldots, h\_k, v\_k$ and $HV\_\{n-k\} = h'\_1, v'\_1, \ldots, h'\_\{n-k\}, v'\_\{n-k\}$, where $v\_k = V\_n \& \ldots \& V[n-k+1]$.

17. The storage medium of claim 14, wherein the circuit structure defined by the processor includes a carry module and further including third processor executable instructions that enable the processor to optimize a distribution of negation elements in the carry module, the third processor executable instructions comprising:
    processor executable instructions that enable the processor to identify a set of delay vectors in each portion of the carry module,
    processor executable instructions that enable the processor to recursively compare the delay vectors in each portion to derive a set of minimum vectors, and
    processor executable instructions that enable the processor to select a vector for each portion with a minimum norm from the set of minimum vectors.

18. The storage medium of claim 14, further including third processor executable instructions that enable the processor to minimize depth of the adder base circuit, the third processor executable instructions comprising:
    processor executable instructions that enable the processor to recursively expand expressions $$DH\_n = \min\{\max(DH\_\{n-k\}+1, Dh\_k+2, DH\_k)\} \text{ and}$$

$$Dh\_n = \min\{\max(Dh\_\{n-k\}+1, Dh\_k+2)\}$$

where $DH\_k$ and $Dh\_k$ are based on vectors of depths $U[i]$ for $0 \leq i \leq k-1$ and $DH\_\{n-k\}$ and $Dh\_\{n-k\}$ are based on vectors for $k \leq i \leq n-1$, and
    processor executable instructions that enable the processor to selecting a value of k based on a minimum of at least one of $DH\_n$ and $Dh\_n$.

19. The storage medium of claim 18, wherein the computer instructions that enable the processor to select a value of k comprises:
    processor executable instructions that enable the processor to calculate vectors $DHh\_n$ based on maximum values of $DH\_n$ and $Dh\_n$, processor executable instructions that enable the processor to sort values of k to derive a set of minimum vectors DHh__n, and processor executable instructions that enable the processor to search the set of minimum vectors to select a value of k.

20. The storage medium of claim 14, further including third processor executable instructions that enable the processor to minimize fanout depth of the adder base circuit, the third processor executable instructions comprising:

processor executable instructions that enable the processor to define recursive functions $$H\hat{\ }i\_k = h\hat{\ }\{i+1\}\_\{k-1\} \vee v\hat{\ }\{i+1\}\_\{k-l\} \& h\hat{\ }i\_l$$

and $$v\hat{\ }i\_l = v\hat{\ }\{i+1\}\_\{k\hat{\ }l\} \& v\hat{\ }i\_l$$

based on a function of the adder based circuit, where k=F__l and n−k=F__{l−1}, l satisfies F__l<n≦F__{l+1}, {F__l} is the Fibonacci series defined from the equality F__{l+1}=F{l}+F__{l+1} and n is the number of bits of an input to the adder based circuit, and processor executable instructions that enable the processor to recursively expand the recursive functions to minimize 1.

* * * * *